(12) United States Patent
Mairs et al.

(10) Patent No.: US 10,095,393 B2
(45) Date of Patent: *Oct. 9, 2018

(54) MOBILE DEVICE WITH GRAPHICAL USER INTERFACE FOR INTERACTING WITH A BUILDING AUTOMATION SYSTEM

(71) Applicant: TRANE INTERNATIONAL INC., Davidson, NC (US)

(72) Inventors: Susan M. Mairs, St. Paul, MN (US); Bryan George Kinney, Stillwater, MN (US); Kimberly Hayman, Minneapolis, MN (US); Melissa Rose Schumann, Brooklyn Park, MN (US); Rachel Michael Nilsson, Minneapolis, MN (US); Jacob Larson, Minneapolis, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/166,733

(22) Filed: May 27, 2016

(65) Prior Publication Data

US 2016/0274775 A1 Sep. 22, 2016

Related U.S. Application Data

(63) Continuation of application No. 13/972,258, filed on Aug. 21, 2013, now Pat. No. 9,354,774.
(Continued)

(51) Int. Cl.
*G06F 3/0484* (2013.01)
*G06F 3/0481* (2013.01)
(Continued)

(52) U.S. Cl.
CPC ........ *G06F 3/04845* (2013.01); *G06F 1/1694* (2013.01); *G06F 3/0346* (2013.01); *G06F 3/0482* (2013.01); *G06F 3/0488* (2013.01); *G06F 3/04817* (2013.01); *G06F 3/04883* (2013.01); *G06F 3/14* (2013.01); *G06T 13/80* (2013.01); *G09G 5/12* (2013.01);
(Continued)

(58) Field of Classification Search
CPC ..... G06F 3/0484; G06F 3/0488; G06F 3/0482
See application file for complete search history.

(56) References Cited

U.S. PATENT DOCUMENTS 7,039,596 B1* 5/2006 Lu .................... G06Q 10/06311
705/7.13
7,130,719 B2 10/2006 Ehlers et al.
(Continued)

OTHER PUBLICATIONS iPad Home Screen (Aug. 2011).
IBM Web Experience (Jun. 27, 2012).

*Primary Examiner* — David Choi
(74) *Attorney, Agent, or Firm* — Hamre, Schumann, Mueller & Larson, P.C.

(57) ABSTRACT

A mobile device with a graphical user interface for remotely monitoring and/or remotely interacting with a configurable building automation systems (BAS). In particular, the mobile device's graphical user interface that has a portrait mode and a landscape mode, and the graphical user interface is displayed on the touchscreen in the portrait mode or the landscape mode based on the orientation of the mobile device.

8 Claims, 7 Drawing Sheets

Related U.S. Application Data

(60) Provisional application No. 61/691,549, filed on Aug. 21, 2012.

(51) Int. Cl.
*G06F 3/0488* (2013.01)
*G06F 1/16* (2006.01)
*G06F 3/0346* (2013.01)
*G06F 3/0482* (2013.01)
*G06F 3/14* (2006.01)
*G06T 13/80* (2011.01)
*G09G 5/12* (2006.01)

(52) U.S. Cl.
CPC ............ *G05B 2219/23051* (2013.01); *G05B 2219/25167* (2013.01); *G05B 2219/2642* (2013.01); *G06F 2200/1614* (2013.01); *G09G 2370/02* (2013.01); *G09G 2370/06* (2013.01)

(56) References Cited

U.S. PATENT DOCUMENTS

| | | | |
|---|---|---|---|
| 7,343,226 B2 | 3/2008 | Ehlers et al. | |
| 7,676,280 B1 | 3/2010 | Bash et al. | |
| 7,702,421 B2 | 4/2010 | Sullivan et al. | |
| 7,870,080 B2 | 1/2011 | Budike, Jr. | |
| 7,904,186 B2 | 3/2011 | Mairs et al. | |
| 7,917,232 B2 | 3/2011 | McCoy et al. | |
| 8,024,054 B2 | 9/2011 | Mairs et al. | |
| 8,042,048 B2 | 10/2011 | Wilson et al. | |
| 8,099,178 B2 | 1/2012 | Mairs et al. | |
| 8,174,381 B2 | 5/2012 | Imes et al. | |
| 8,180,492 B2 | 5/2012 | Steinberg | |
| 8,327,272 B2* | 12/2012 | Anzures | G06F 1/1626 715/731 |
| 8,375,118 B2* | 2/2013 | Hao | G05B 15/02 709/223 |
| 8,712,820 B2* | 4/2014 | Gingras | G06Q 10/109 705/7.18 |
| 8,878,852 B1* | 11/2014 | Klein | H04L 43/0811 345/440 |
| 2007/0008099 A1 | 1/2007 | Kimmel et al. | |
| 2009/0174680 A1* | 7/2009 | Anzures | G06F 1/1626 345/173 |
| 2010/0039283 A1 | 2/2010 | Ratcliff | |
| 2010/0261465 A1 | 10/2010 | Rhoads et al. | |
| 2011/0040836 A1* | 2/2011 | Allen | H04L 65/1093 709/205 |
| 2011/0053219 A1* | 3/2011 | Nicaud | C12N 15/815 435/69.1 |
| 2011/0071878 A1* | 3/2011 | Gingras | G06Q 10/109 705/7.18 |
| 2011/0087988 A1 | 4/2011 | Ray et al. | |
| 2011/0167382 A1* | 7/2011 | van Os | G06Q 10/109 715/800 |
| 2011/0214060 A1* | 9/2011 | Imes | G05B 15/02 715/735 |
| 2011/0214085 A1 | 9/2011 | Vanbree | |
| 2012/0007891 A1* | 1/2012 | Chiang | G06F 1/1626 345/650 |
| 2012/0135759 A1 | 5/2012 | Imes et al. | |
| 2012/0221151 A1 | 8/2012 | Steinberg | |
| 2012/0303476 A1* | 11/2012 | Krzyzanowski | G06F 8/60 705/26.5 |
| 2013/0315040 A1* | 11/2013 | Malkin | G04D 99/00 368/10 |
| 2014/0059483 A1* | 2/2014 | Mairs | G06F 3/04817 715/788 |

\* cited by examiner

MOBILE DEVICE WITH GRAPHICAL USER INTERFACE FOR INTERACTING WITH A BUILDING AUTOMATION SYSTEM

FIELD

This disclosure generally relates to a mobile device with a graphical user interface for remotely monitoring and/or operating a building automation system.

BACKGROUND

A Building automation system (BAS) is used to coordinate, manage, and automate control of diverse environmental, physical, and electrical building subsystems, particularly HVAC and climate control, but also including security, lighting, power, and the like.

Hardwiring and programming of a BAS can create a robust fixed system customized for a particular installation. However, monitoring and maintenance of the BAS are still generally labor-intensive tasks that vary with each system implementation. In a common scenario, a user managing a building site must be at the location of the BAS and use a computer or other device hardwired to the BAS. If there is an issue with how the BAS is operating, the user managing the building site must physically be at the BAS to monitor the issue and to resolve the issue. If the user is not physically at the BAS location and receives notification that there is an issue with the BAS, generally, the user must physically go to the BAS location to monitor and to resolve the issue.

SUMMARY

The embodiments described herein relate to a mobile device for interacting with a BAS remotely. Preferred embodiment relate to the mobile device for interacting with HVAC (heating, ventilation, and air conditioning) related aspects of the BAS.

The mobile device for remote operation of a building automation system includes a processor in communication with a memory, a network interface, a touchscreen, and an accelerometer that detects an orientation with respect to a gravitational center and communicates the orientation to the processor. The processor executes instructions for a graphical user interface (GUI) and displays the GUI on the touchscreen. The GUI includes a portrait mode and a landscape mode. The GUI is displayed on the touchscreen in the portrait mode or the landscape mode based on the orientation. Each of the portrait mode and the landscape mode of the GUI includes a screen and a navigation bar. The navigation bar includes a plurality of icons. Each of the icons is associated with an interactive screen, wherein a selection of one of the icons by touching the touchscreen is detectable by the processor to display in the screen the interactive screen associated with the one of the icons. The GUI is configured to receive operational instructions via the touchscreen, relay the operational instructions to the processor, and the processor is configured to send the operational instructions to the BAS via a transmission from the network interface.

In an embodiment, the mobile device includes a portrait mode of the GUI that includes a screen having a longer length than width, and the navigation bar includes five icons disposed horizontally along the width of the GUI.

In an embodiment, the mobile device includes a landscape mode of the GUI includes a screen having a shorter length than width, and the navigation bar includes seven icons disposed horizontally along the width of the GUI.

In an embodiment, the mobile device includes an interactive screen that includes a portrait interactive screen and a landscape interactive screen, wherein the processor displays in the screen the portrait interactive screen or the landscape interactive screen based on the orientation.

In an embodiment, the network interface of the mobile device receives operation schedule data from the BAS in real time, and the processor displays in the interactive screen the operation schedule data as an interactive graphic. In an embodiment, the interactive graphic includes a net operation schedule data of the BAS. In an embodiment, the interactive graphic includes an itemized operation schedule data of the BAS.

In an embodiment, the interactive graphic includes a net operation schedule data of the BAS when the GUI is in the portrait mode, and the interactive graphic includes an itemized operation schedule data of the BAS when the GUI is in the landscape mode. In another embodiment, the interactive graphic does not include an itemized operation schedule data of the BAS when the GUI is in the portrait mode.

The processor is configured to receive data in real time from the BAS via the network interface. Data received in real time includes status data of the BAS or any areas associated with the BAS. The term "area" describes, for example, but is not limited to, a building, a room, a system, a subsystem, a unit, a device, or any combinations thereof. The phrase "associated with a BAS" means something that is connected to, is a part of, is controlled by, is monitored by, and/or controls the BAS.

In an embodiment, the network interface of the mobile device receives condition data of an area associated with the building automation system in real time, and the processor displays in the interactive screen the condition data as an interactive graphic.

The condition data includes, but are not limited to, space temperature, space temperature setpoint, variance of space temp from setpoint, discharge air temperature, supply water or air temperature, space humidity, space power status, space light status, space airflow, and/or alarms for the space. Further, condition data includes equipment data, such as the operating information and setpoints for air handlers such as, but not limited to, duct static pressure, heating and cooling capacity, discharge air temperature and flow, and supply fan control, and for chillers such as, but not limited to, running mode, running capacity, evaporator leaving water temperature, chilled water setpoint, demand limit setpoints and active heating or cooling setpoints. Further, condition data includes system data, such as the operating information and setpoints for area systems such as, but not limited to, the same type of data as for spaces, economizing and humidity management, outdoor air conditions, optimal start conditions, night purge functions, and data about its space and equipment member participants; for chiller plant systems such as, but not limited to, chilled water data for sensors, request, return, pump, supply and cooling rate, chiller rotation schedule and priorities, and chiller operation shutdowns, lockouts, and delays, and data about its chiller equipment member participants; and for variable air systems such as, but not limited to, space temperature minimum and maximum settings, duct static optimization, ventilation optimization, calibration management, common space commands, and data about its space and air handler member participants. Further, condition data includes point data for user created points in the system such as their current value, their service state and values, the minimum and maximum values, and their alarm trigger conditions. Further, condition data includes override data for any of the above-mentioned controllable data including whether the setpoints can be overridden, are currently being overridden and at what priority level, and whether the override is permanent or will expire and at what time. Further, condition data includes schedule data including, but not limited to the schedule that is active to run at any time of any day, the normal schedule for any time and the exception schedules being applied for that time, and the transition values each time the schedule is expected to change, whether a schedule has optimization settings for start and stop times, and all the member equipment that is participating in the active schedule.

In an embodiment, the interactive graphic includes an animated image of the area. In an embodiment, the interactive graphic includes a blueprint image of the area, wherein the condition data is shown in a portion of the blueprint image, wherein the condition data and the portion are associated according to the condition data received from the building automation system.

In an embodiment of the mobile device, the interactive screen includes a portrait interactive screen and a landscape interactive screen, wherein the processor displays in the screen the portrait interactive screen or the landscape interactive screen based on the orientation of the mobile device. The network interface of the mobile device can receive condition data of an area associated with the building automation system in real time, and the condition data is displayed in the portrait interactive screen when the GUI is in the portrait mode, and the condition data is displayed in the landscape interactive screen as an interactive graphic when the GUI is in the landscape mode.

BRIEF DESCRIPTION OF THE DRAWINGS

Referring now to the drawings in which like reference numbers represent corresponding parts throughout.

FIG. 3A shows an example of the GUI in portrait mode. FIG. 3B shows an example illustration of the GUI in landscape mode. FIG. 4A shows an example of the GUI in portrait mode. FIG. 4B shows an example illustration of the GUI in landscape mode.

DETAILED DESCRIPTION

The embodiments described herein are directed to a mobile device with a GUI for remotely monitoring and/or operating a building automation system.

Figure 1:
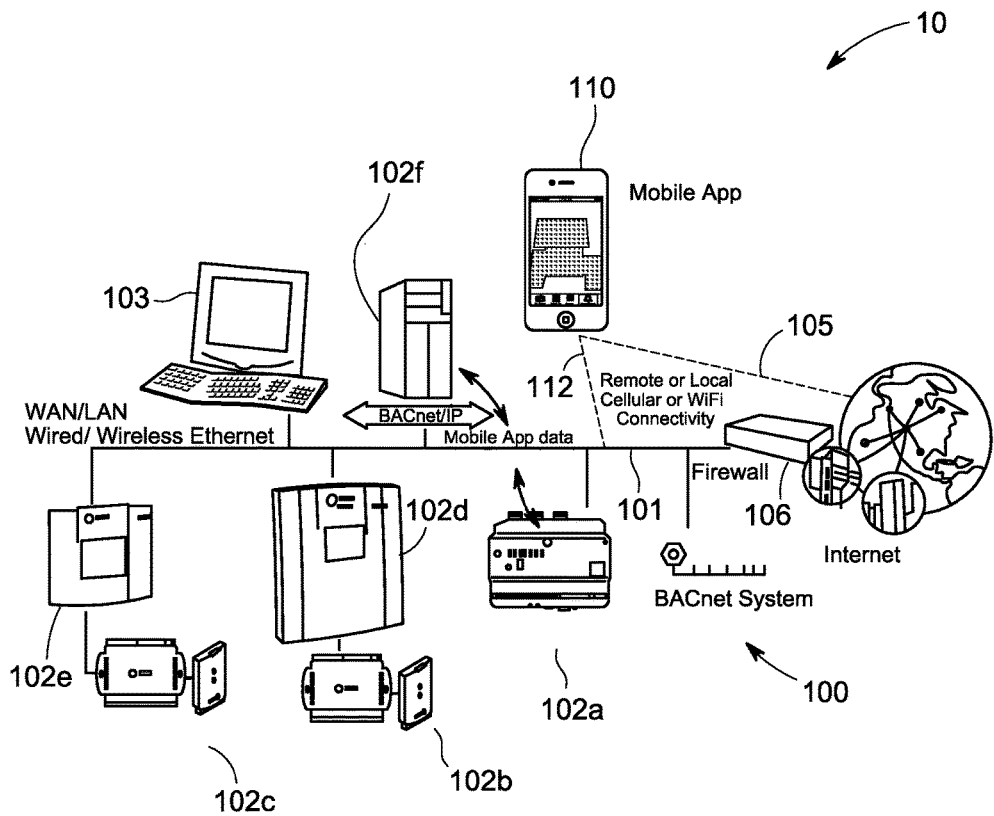
FIG. 1 is a cartoon diagram of a building automation system (BAS) connected to a mobile device according to one embodiment.

FIG. 1 shows a cartoon of a system 10 including an embodiment of a BAS 100 that includes a hardwired network 101 that uses a communication standard or protocol to link various subsystems, such as a system control unit 102a, a unit control device 102b, 102c, and/or other devices 102d, 102e, 102f, and provide a system-wide user access and control from a computer 103 hardwired to the network. The BAS 100 is connected to the internet 105, and includes a network security device 106, such as a firewall, that secures and protects the BAS 100 from unwanted intrusion via the internet 105.

The embodiment includes a mobile device 110 connectable to the BAS 100 via the internet 105, accessing the BAS 100 through the network security device 106. The mobile device 110 can connect to the BAS 100 via a local wireless connection 112. The local wireless connection 112 can be established behind the network security device 106, so that the mobile device 110 can connect to one or more of the components or devices 102a-f of the BAS 100 without requiring the communication between the mobile device 110 and the BAS 100 to go through the network security device 106.

The mobile device 110 can connect to the BAS 100 via the internet 105 using cellular, 3G, 4G, or other wireless communication protocol. The mobile device 110 can connect to the BAS 100 via the local wireless connection 112 using WiFi, bluetooth, or other wireless communication protocol. The mobile device 110 can connect to the BAS 100 using a combination of the internet 105 and local wireless connection 112.

Figure 2:
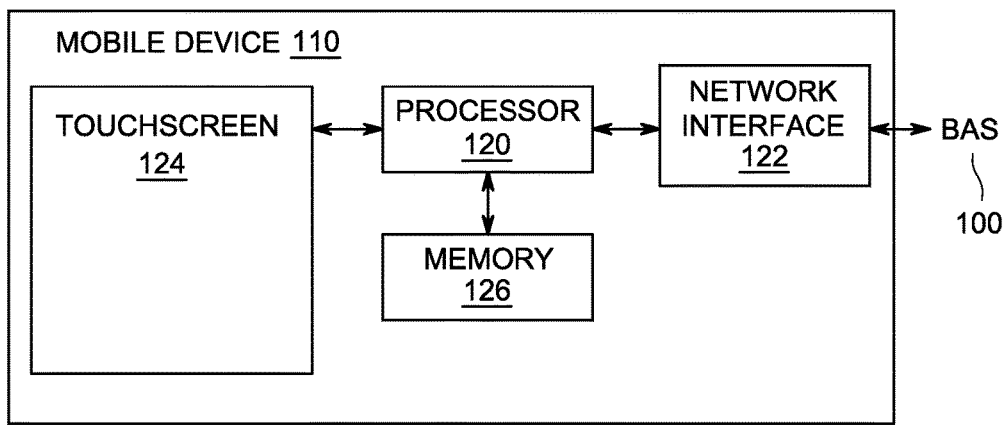
FIG. 2 is a schematic diagram of a mobile device according to one embodiment.

FIG. 2 shows an illustrated schematic diagram of an embodiment of a mobile device 110. The mobile device 110 includes a processor 120 in communication with a network interface 122 and a touchscreen 124. The touchscreen 124 is a combination display and a human-computer interface device. The touchscreen 124 displays images as instructed by the processor 120. The touchscreen 124 can detect user input via touch or contact by a human finger or a stylus device, and sends the input to the processor 120. A memory 126 is in communication with the processor 120, and the memory 126 stores instructions for an operating system that is executed by the processor 120. The memory 126 can also store instructions for a computer program that is executed by the processor 120. The computer program includes a GUI for remote operation of a BAS 100.

The processor 120 is in communication with an accelerometer 128. The accelerometer 128 can be, for example, a solid-state accelerometer. The accelerometer 128 detects its orientation with respect to a gravitational center and communicates its orientation information to the processor 120.

Orientation information is data based on, for example, acceleration applied to the accelerometer 128 due to gravitational pull. The data includes a direction of the gravitational pull, which generally is towards a gravitational center, e.g. center of the Earth.

The processor 120 of the mobile device 110 can use the orientation information to calculate and/or determine the orientation of the mobile device 110 with respect to the center of the Earth. The processor 120 can use the orientation information to provide different outputs via the touchscreen 124 according to the instructions being executed by the processor 120.

Embodiments of the mobile device 110 include, but are not limited to, a smartphone, an iPhone, an iPad, an iPod, an Android phone, an Android tablet, a Windows phone, a Windows tablet, etc. Embodiments of the operating system include, but are not limited to, iOS, Android OS (e.g. Donut, Eclair, Gingerbread, Honeycomb, Ice Cream Sandwich, Jelly Bean, etc.), Windows, etc. Embodiments of the computer program include, but are not limited to, software for mobile device 110s commonly called an "App" or "Mobile App," a script written in a scripting language, etc.

According to an embodiment, a GUI is displayed on the touchscreen 124 when the computer program instructions are executed by the processor 120, the GUI displays information to a user and also provides various input points for the user to interact with the GUI so that the user is allowed to provide input, such as operational commands or data request, which is sent to the processor 120. The processor 120 can then process the input according to the computer program instructions being executed and can communicate with the memory 126 and/or network interface 122 to provide data to be displayed on the touchscreen 124.

An embodiment of a computer program is stored on a computer readable medium, wherein the computer program includes computer readable instructions that can be executed by a processor 120 to display a GUI on a touchscreen 124 configured to provide data output on the touchscreen 124, and at the same time, receive operational input for remotely monitoring and/or operating a BAS 100. The data output provided can be in real time, as the data is received from the BAS 100 to the mobile device 110 via the network interface 122 of the mobile device 110.

Accordingly, a user of the mobile device 110 can be located almost anywhere and monitor and/or interact with the operation of the BAS 100, as long as the mobile device 110 can wirelessly connect to the BAS 100.

FIGS. 3A, 3B, 4A, and 4B show illustrations of an embodiment of a mobile device 110 for remote operation and/or monitoring of a BAS. The mobile device 110 has a touchscreen 124 displaying a GUI 200 which includes a screen portion 202 (or screen) and a navigation bar portion (or navigation bar) 204. The navigation bar 204 includes a plurality of icons (206a, 206b, 206c, 206d, 206e in FIGS. 3A and 4A; 206a, 206b, 206c, 206d, 206e, 206f, 206g in FIGS. 3B and 4B). It is to be understood that the term icon describes a computer generated graphic image that is used in the GUI 200 for displaying information and/or for allowing a human to interact with the mobile device 110.

Figure 3A:
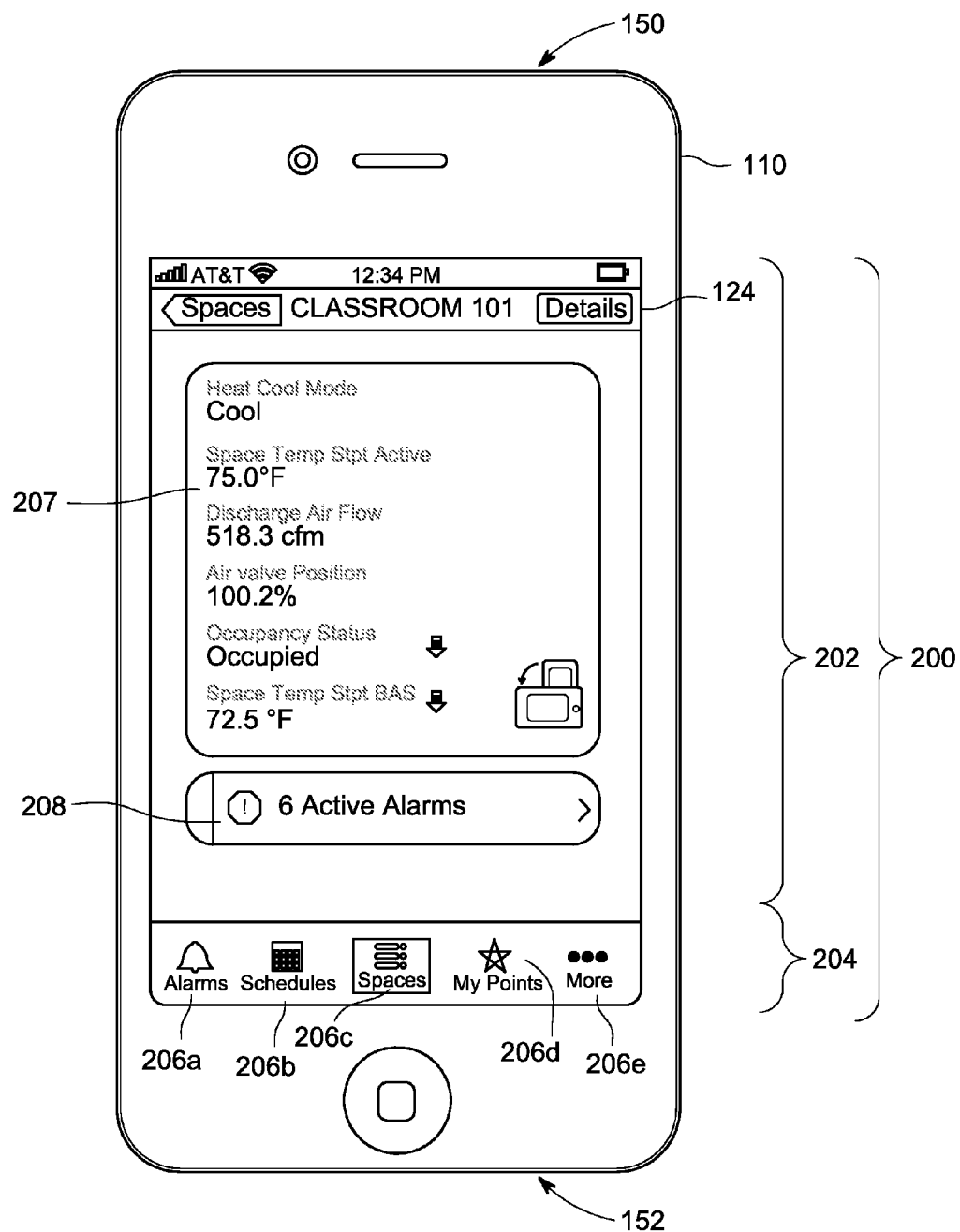
FIGS. 3A, 3B, 4A, and 4B are illustrations of a mobile device with a GUI according to one embodiment.
Figure 4A:
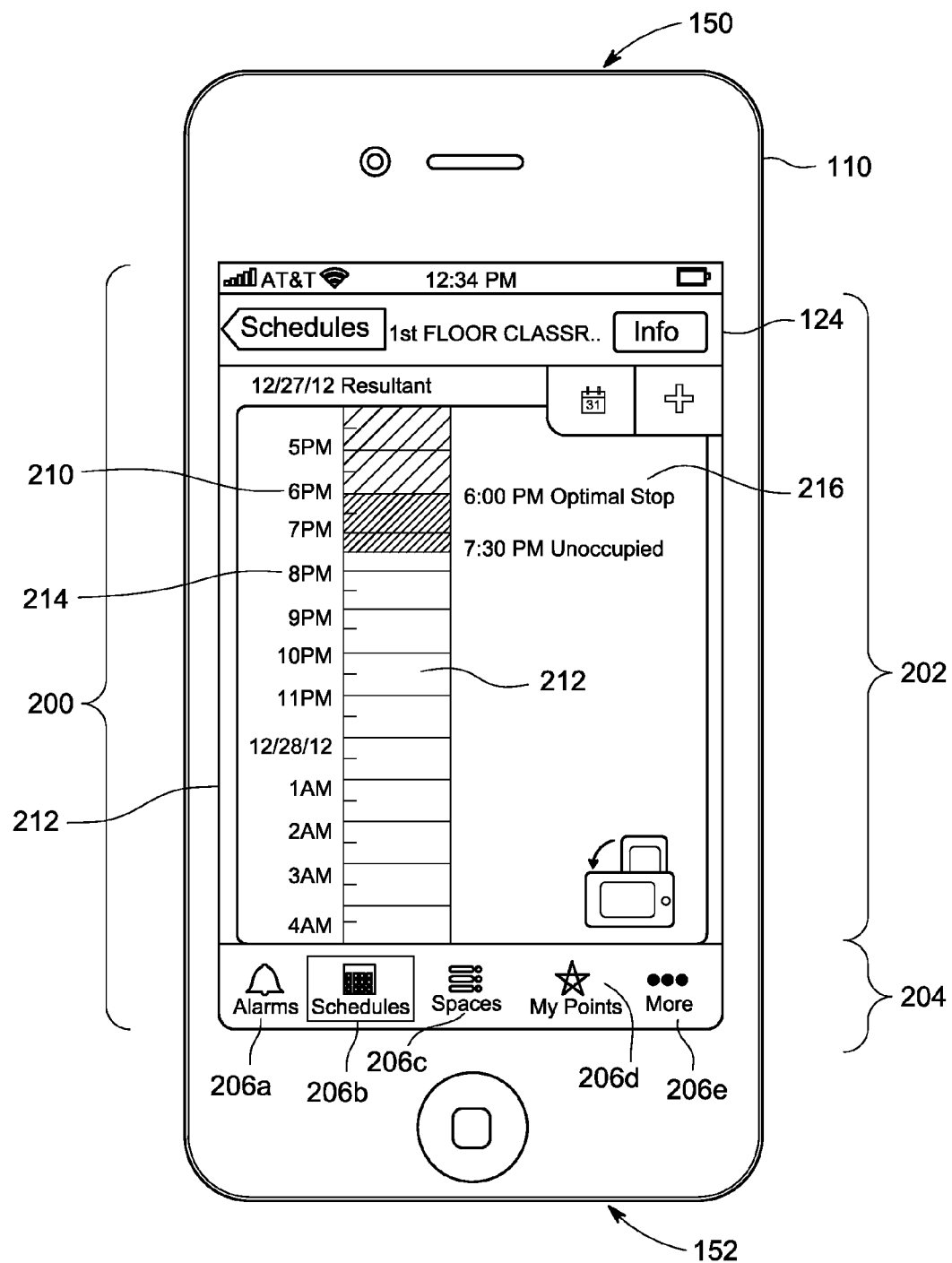

FIGS. 3A and 4A show examples of the GUI 200 in the portrait mode, when, for example, the mobile device 110 is held with a top portion 150 "up," i.e. farther away from the center of the Earth than a bottom portion 152 of the mobile device 110. The GUI 200 can also be in the portrait mode when the mobile device 110 is held with the bottom portion 152 "up," i.e. farther away from the center of the Earth than the top portion 150 of the mobile device 110.

This position of the mobile device 110 is detected by the accelerometer, and the GUI 200 is displayed on the touchscreen 124 in the portrait mode or the landscape mode based on the orientation. The navigation bar 204 includes a plurality of icons 206a, 206b, 206c, 206d, 206e wherein each of the icons 206a-e are associated with an interactive screen, so that when one of the icons is selected by touching the touchscreen 124, the interactive screen associated with the selected icon is displayed in the screen 202 of the GUI 200. The screen 202 is positioned above the navigation bar 204. The navigation bar has the five icons 206a-e displayed therein, disposed horizontally along the width of the GUI. In the portrait mode of the GUI 200, the screen 202 has a longer length (height) than width.

Figure 3B:
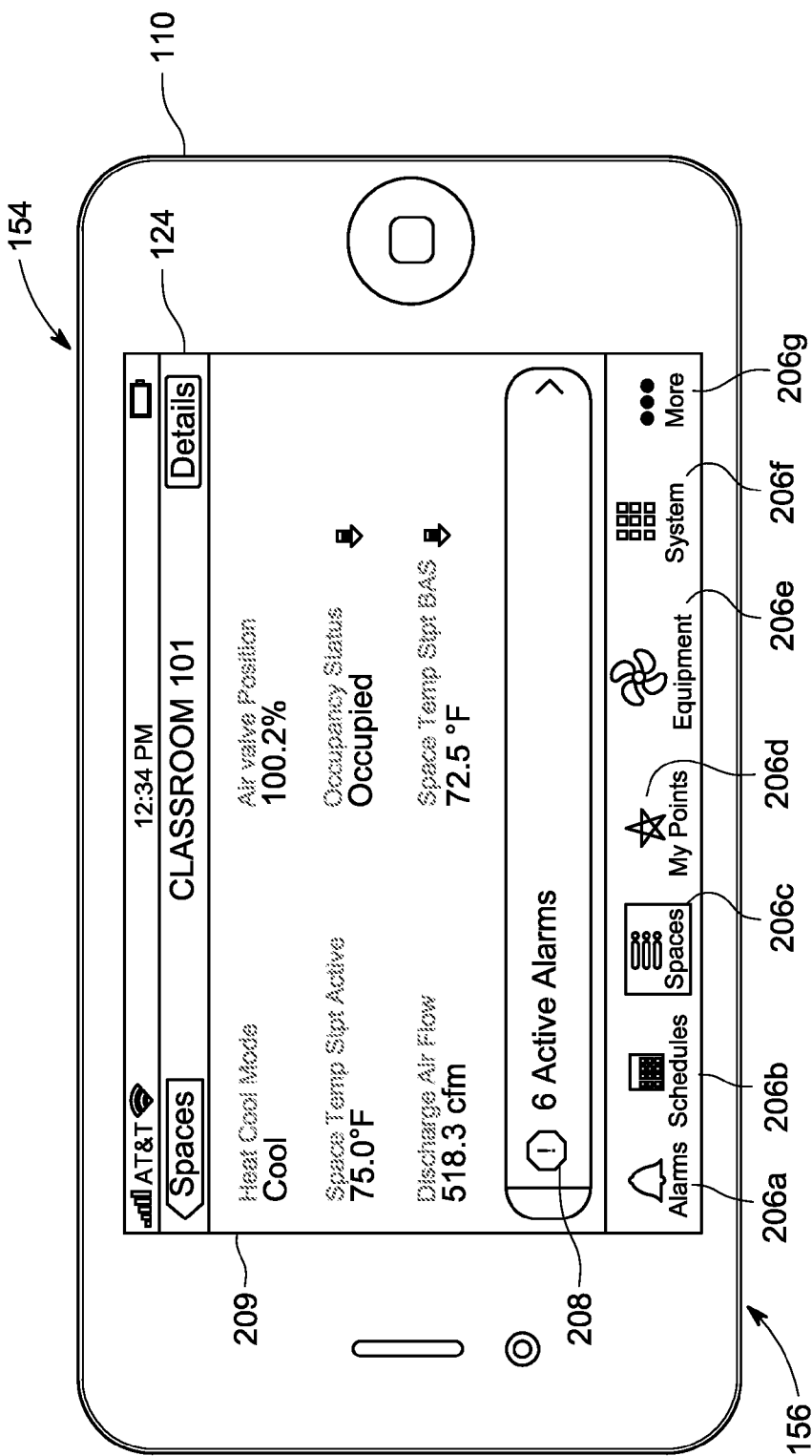
Figure 4B:
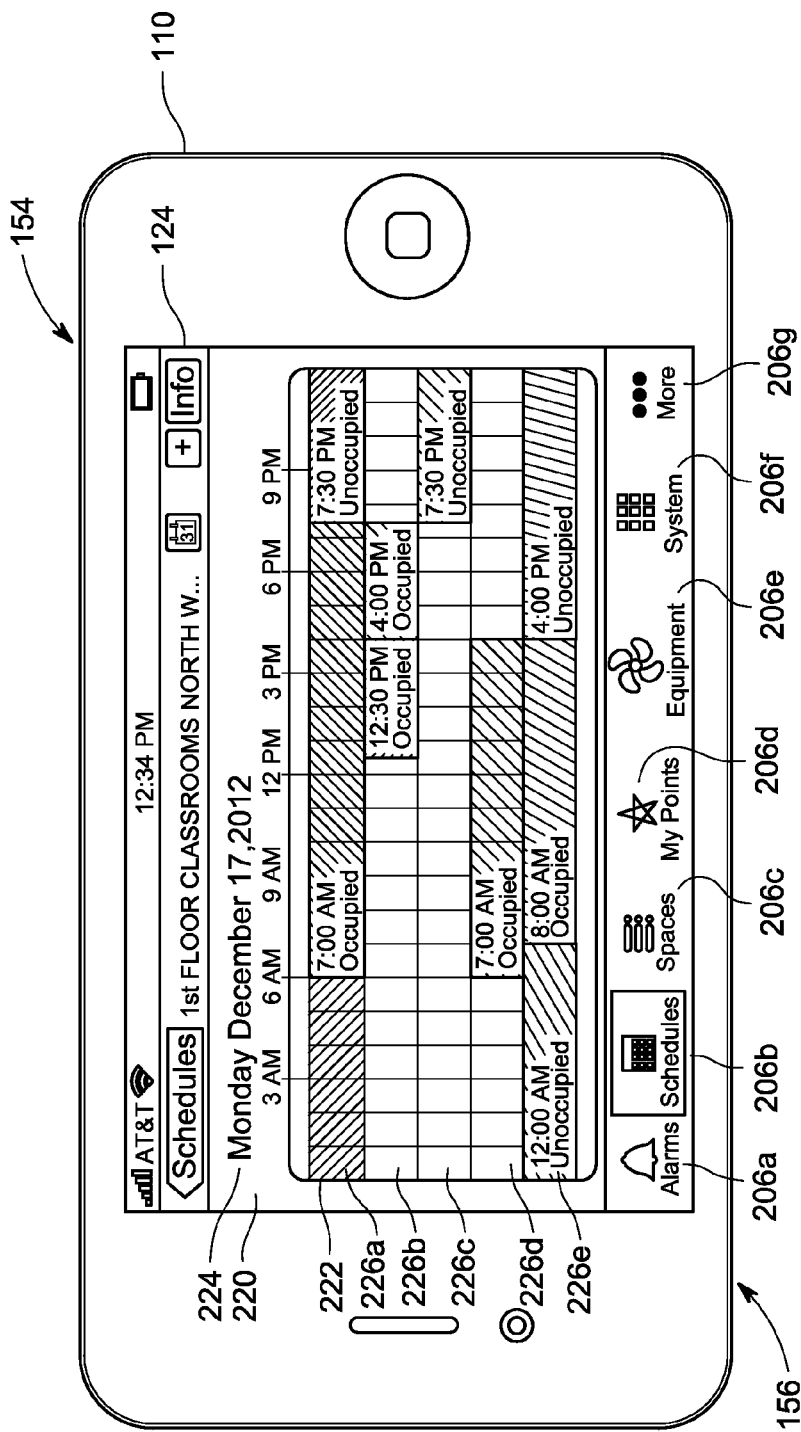

FIGS. 3B and 4B show examples of the GUI 200 in the landscape mode, when, for example, the mobile device 110 is held with one of the side portions 154 "up," i.e. farther away from the center of the Earth than another side portion 156 of the mobile device 110. This position of the mobile device 110 is detected by the accelerometer. The navigation bar 204 includes a plurality of icons 206a, 206b, 206c, 206d, 206e, 206f, 206g wherein each of the icons 206a-g are associated with an interactive screen, so that when one of the icons is selected by touching the touchscreen 124, the interactive screen associated with the selected icon is displayed in the screen 202 of the GUI 200. The screen 202 is positioned above the navigation bar 204. The navigation bar has the seven icons 206a-g displayed therein, disposed horizontally along the width of the GUI. In the landscape mode of the GUI 200, the screen 202 has a shorter length than width.

FIG. 3A shows the icon 206c having been selected. In FIG. 3A, a portrait interactive screen 207 that is associated with the icon 206c is displayed in the screen 202 of the GUI 200 on the touchscreen 124 of the mobile device 110. The portrait interactive screen 207 includes real time conditions of an area associated with the BAS. The term area associated with the BAS describes, but is not limited to, one or more of a component, a device, a unit, a system, a subsystem, a controller, a space, a building, a room, etc. The component may be the condenser or the evaporator, the unit may be a chiller, the system can be a HVAC system or circuit, the subsystem can be a control system for the HVAC system.

The real time conditions are from real time data sent from the BAS, received by the network interface of the mobile device 110, processed by the processor of the mobile device 110, and displayed on the touchscreen 124 of the mobile device within the GUI 200. A receipt of alarm data 208 is displayed in the screen 202.

FIG. 3B also shows the icon 206c having been selected. In FIG. 3B, a landscape interactive screen 209 that is associated with the icon 206c is displayed in the screen 202 of the GUI 200 on the touchscreen 124 of the mobile device 110. The landscape interactive screen 209, like the portrait interactive screen 209 shown in FIG. 3A, includes real time conditions of an area associated with the BAS. The real time conditions are from real time data sent from the BAS, received by the network interface of the mobile device 110, processed by the processor of the mobile device 110, and displayed on the touchscreen 124 of the mobile device within the GUI 200. The receipt of alarm data 208 is also displayed in the screen 202.

FIG. 4A shows the icon 206b having been selected. In FIG. 4A, a portrait interactive screen 210 that is associated with the icon 206c is displayed in the screen 202 of the GUI 200 on the touchscreen 124 of the mobile device 110. The portrait interactive screen 210 includes an operation schedule of the BAS displayed graphically and interactively. The network interface of the mobile device 110 can receive the operation schedule data from the BAS in real time, and when the icon 206b is selected, the processor displays the operation schedule data as an interactive graphic 212, which can have multiple colors that can be interactively scrolled along the screen 202 by touching the touchscreen 124.

An example of the operation schedule of the BAS is described as follows. A BAS controls various conditions of an area, such as a room in a building, wherein it is known that, generally, the room is occupied by a person from 8:00 A.M. to 5:00 P.M. on Mondays to Friday. In the other times, the room is not occupied. Further, during certain holidays, the room is unoccupied. Thus, the BAS can be set (i.e. programmed) to operate differently or in a same manner based on time data, i.e. the day of the week, the time of the day, and certain holidays. Further, any component, device, system, subsystem, unit, space, or any combinations thereof, which are associated with the BAS can be set to operate differently or in a same manner based on the time data.

For example, when the room is known to be generally occupied, the BAS can be set to turn on the lights in the room, allow HVAC to provide air to the room, and set the temperature of the room to 75° F. Further, for example, when the room is unoccupied, the BAS can be set to turn off the lights in the room, stop providing air from the HVAC, and set the temperature of the room to 85° F. (if it is summer) or 55° F. (if it is winter). Other conditions, such as water temperature, power, humidity level, air flow rate, etc. can be set based on the time data.

This "setting" or "programming" of how the BAS is to operate based on the time data is an example of the operation schedule of the BAS. The operation schedule can provide efficient use of resources, for example, to use power to provide desired conditions of a room or a building only when those spaces are expected to be in use by a person.

Further, the operation schedule of the BAS can change based on a person or the people who use the room or the building. For example, in addition to a first setting of the operation schedule of the BAS, additional settings can be made to the operation schedule of the BAS. These additional settings that would change the first setting of the operation schedule of the BAS is described herein as an "exception." More than one exception can be made to the operation schedule of the BAS. When all of the exceptions are considered and combined with the first setting of the operation schedule of the BAS, a net operation schedule can be obtained. When exceptions are made, certain settings can have priority over other settings. For example, a setting to turn off the lights at a particular time can be overridden by a higher priority setting of turn on the lights when an area is scheduled to be "Occupied." As another example, conflicting settings can be settled based on the last entered setting overriding the previously set setting. Thus, an exception that is last set has higher priority than all other previously set exceptions (and the first setting) of the operation schedule of the BAS.

FIG. 4A shows the GUI 200 of the mobile device 110 displaying in the screen 202, the net operation schedule of the BAS in real time. The net operation schedule includes time data 214, which can include displayed in a linear format, and an operation data 216, that is information of how the BAS will operate at particular times. The interactive screen 210 allows vertical scrolling of the net operation schedule by a user touching the touchscreen 124. The net operation schedule data of the BAS is displayed in the screen 202 of the GUI 200 as the interactive graphic 212. In an embodiment, the interactive graphic 210 does not include an itemized operation schedule data of the BAS when the GUI is in the portrait mode.

FIG. 4B shows the icon 206b having been selected. In FIG. 4B, a landscape interactive screen 220 that is associated with the icon 206c is displayed in the screen 202 of the GUI 200 on the touchscreen 124 of the mobile device 110. The landscape interactive screen 220 includes an operation schedule of the BAS displayed graphically and interactively. The network interface of the mobile device 110 can receive the operation schedule data from the BAS in real time, and when the icon 206b is selected, the processor displays the operation schedule data as an interactive graphic 222, which can have multiple colors that can be interactively scrolled along the screen 202 by touching the touchscreen 124. The time data 224 is also shown in the screen 202. The interactive graphic 222 includes an itemized operation schedule, which includes a first operation setting 226a and one or more exceptions 226b, 226c, 226d, 226e of the BAS. The itemized operation schedule is received by the mobile device 110 and displayed in the screen 202 in real time. The combination, according to one or more of the priority described above, of the itemized operation schedule results in the net operation schedule, which is displayed in the portrait mode screen 210 shown in FIG. 4A.

Thus, advantageously, in the portrait position of the mobile device 110, a user can quickly see how the BAS will operate at any given time, while in the landscape position of the mobile device 110, the user can quickly see why the BAS will operate as it will at any given time.

Figure 5:
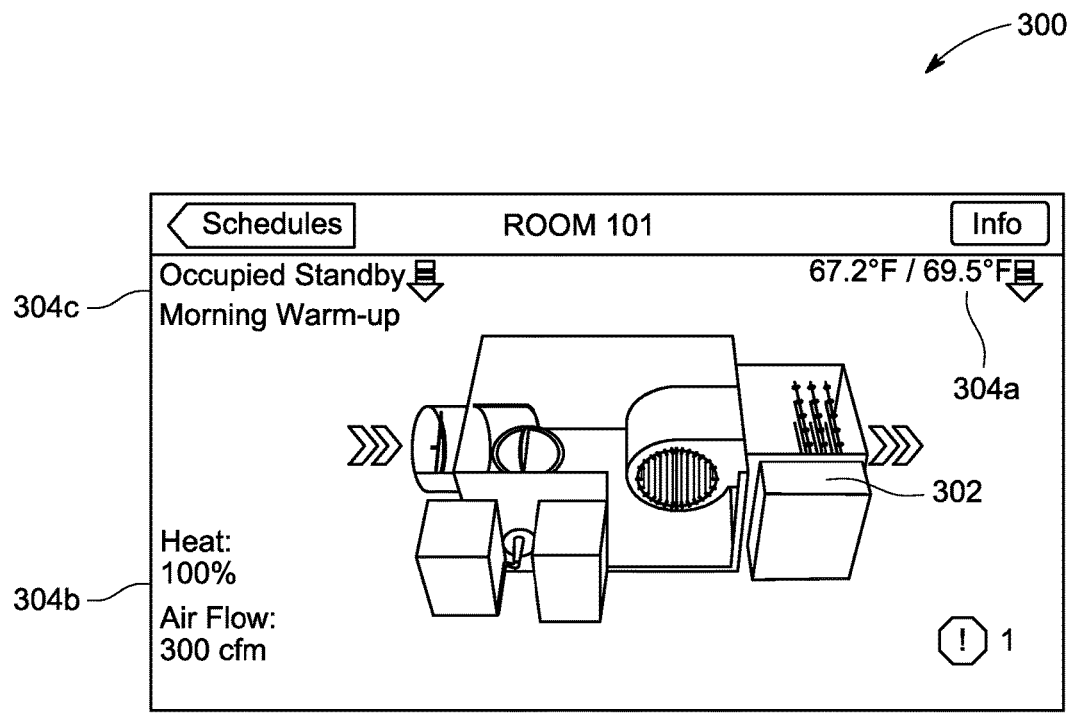
FIG. 5 is an illustration of a portion of a GUI according to one embodiment.

FIG. 5 shows an example of an interactive screen 300 that can be displayed in the screen of the GUI in the landscape mode, when the mobile device shown in FIG. 3A is turned to the side so that the mobile device is positioned similarly to the mobile device shown in FIG. 3B. The interactive screen 300 shows an interactive graphic 302 representing an area, i.e. "Room 101," which can include a static image and/or an animated image of the area associated with the BAS. The interactive screen 300 includes real time condition data 304a, 304b, 304c of the "Room 101."

Figure 6:
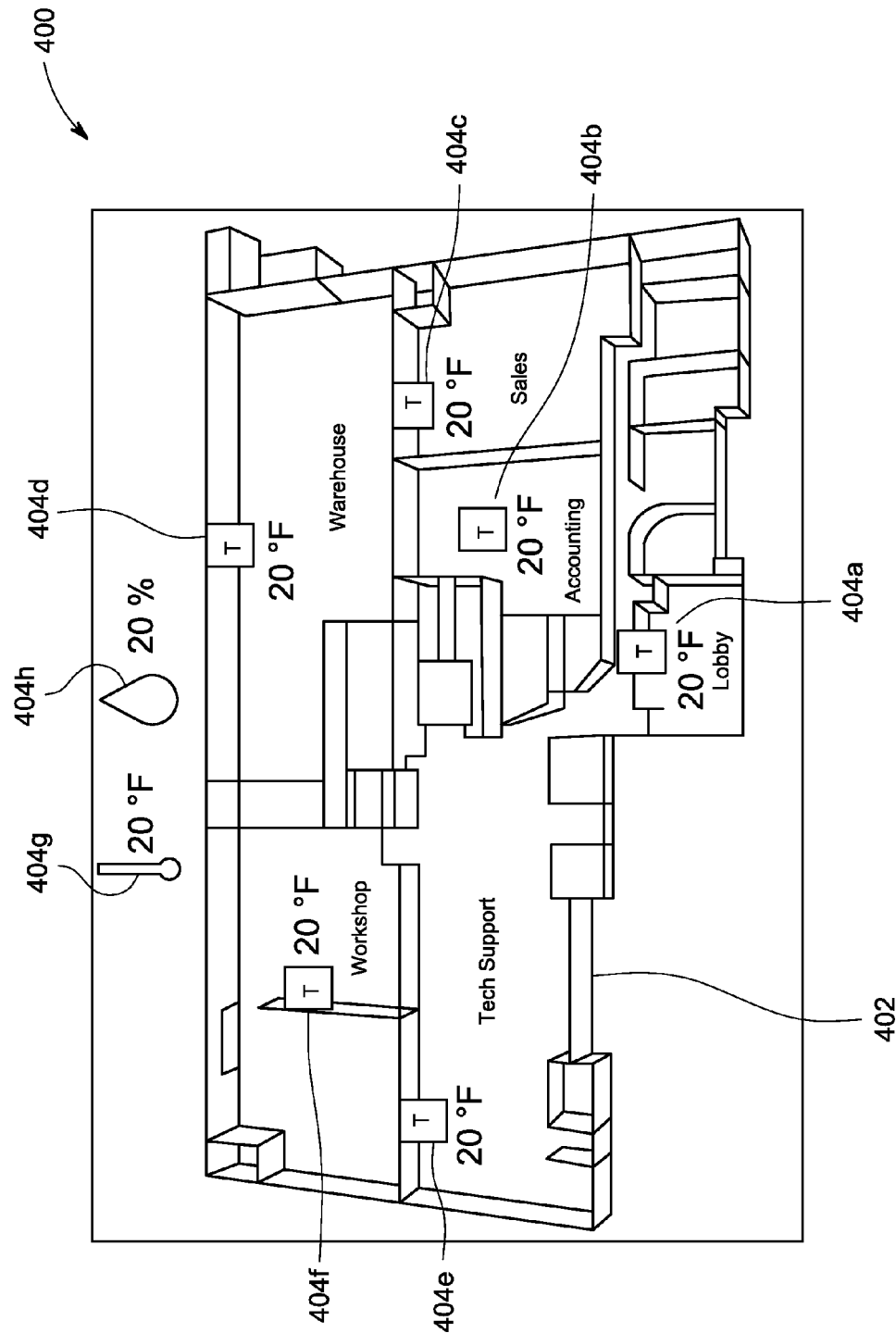
FIG. 6 is an illustration of a portion of a GUI according to one embodiment.

FIG. 6 shows another example of an interactive screen 400 that can be displayed in the screen of the GUI in the portrait mode and/or the landscape mode, when a mobile device is positioned similarly to the mobile device shown in FIGS. 3A and 3B, respectively. The interactive screen 400 shows a graphic representation of an area, i.e. a floor of a building, as an interactive graphic 402. The network interface of the mobile device receives condition data of the area in real time, and the processor displays in the interactive screen 400 the condition data as an interactive graphic 402. The interactive graphic 402 includes a blueprint image 402 of the area, wherein the condition data 404a, 404b, 404c, 404d, 404e, 404f, 404g, 404h are shown. Some of the condition data 404a-f are associated with particular portions of the are (i.e. floor), and these condition data 404a-f are shown in various portions of the blueprint image 402, as associated according to the condition data received from the BAS. Some of the condition data 404g, 404h are for the entire area (i.e. floor) and thus these condition data 404g, 404h can be shown without being particularly associated with a particular portion of the area. Touching any of the portions showing the condition data in the blueprint image 402 can be detected by the touchscreen and the processor to display in the screen of the GUI, an interactive screen similar to the interactive screen 300 shown in FIG. 5.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A mobile device, comprising:
   a processor in communication with a memory, a network interface, a touchscreen, and an accelerometer that detects an orientation with respect to a gravitational center and communicates the orientation to the processor,
   the processor executing instructions read from the memory for a graphical user interface and displaying the graphical user interface on the touchscreen,
   the graphical user interface includes a portrait mode and a landscape mode, wherein the graphical user interface is displayed on the touchscreen in the portrait mode or the landscape mode based on the orientation, wherein the portrait mode and the landscape mode are switchable by toggling a position of the mobile device,
   each of the portrait mode and the landscape mode of the graphical user interface includes a screen and a navigation bar, the navigation bar includes a plurality of icons, each of the icons is associated with an interactive screen, wherein a selection of one of the icons by touching the touchscreen is detectable by the processor to display in the screen the interactive screen associated with the one of the icons, and the graphical user interface is configured to receive operational instructions via the touchscreen, relay the operational instructions to the processor, the processor is configured to send the operational instructions to a remote system via a transmission from the network interface, the network interface receives operation schedule data from the remote system in real time, and the processor displays in the interactive screen the operation schedule data as an interactive graphic, wherein the interactive screen includes a portrait interactive screen and a landscape interactive screen, the processor displays in the screen the landscape interactive screen when the graphical user interface is in the landscape mode, the landscape interactive screen displayed includes an itemized operation schedule data of the remote system, wherein the itemized operation schedule data displayed includes displaying separately a scheduled operation setting and one or more exception settings which can alter the scheduled operation setting, the processor displays in the screen the portrait interactive screen when the graphical user interface is in the portrait mode, the portrait interactive screen displayed includes a net operation schedule data that is a sum of the scheduled operation setting and the one or more exception settings of the itemized operation schedule data of the remote system, and the portrait interactive screen does not include displaying separately the scheduled operation setting and the one or more exception settings of the itemized operation schedule data of the remote system.

2. The mobile device according to claim 1, wherein the portrait mode of the graphical user interface includes a screen having a longer length than width, and the navigation bar includes five icons disposed horizontally along the width of the graphical user interface.

3. The mobile device according to claim 1, wherein the landscape mode of the graphical user interface includes a screen having a shorter length than width, and the navigation bar includes seven icons disposed horizontally along the width of the graphical user interface.

4. The mobile device according to claim 1, wherein the network interface receives condition data of an area associated with the remote system in real time, and the processor displays in the interactive screen the condition data as an interactive graphic.

5. The mobile device according to claim 4, wherein the interactive graphic includes an animated image of the area.

6. The mobile device according to claim 4, wherein the interactive graphic includes a blueprint image of the area, wherein the condition data is shown in a portion of the blueprint image, wherein the condition data and the portion are associated according to the condition data received from the remote system.

7. The mobile device according to claim 1, wherein the network interface receives condition data of an area associated with the remote system in real time, the condition data is displayed in the portrait interactive screen when the graphical user interface is in the portrait mode, and the condition data is displayed in the landscape interactive screen as an interactive graphic when the graphical user interface is in the landscape mode.

8. The mobile device according to claim 1, wherein the remote system is a building automation system.

* * * * *